United States Patent
Pasquereau et al.

(10) Patent No.: US 10,869,270 B2
(45) Date of Patent: Dec. 15, 2020

(54) WIRELESS DEVICE BATTERY OPTIMIZATION BY SUPPRESSING OSCILLATION IN CELL SCOPE DURING IDLE MODE

(71) Applicant: AT&T MOBILITY IP, LLC, Atlanta, GA (US)

(72) Inventors: Benoit Pasquereau, London (GB); David Paul Hayter, Guildford (GB)

(73) Assignee: AT&T MOBILITY IP, LLC, Atlanta, GA (US)

( * ) Notice: Subject to any disclaimer, the term of this patent is extended or adjusted under 35 U.S.C. 154(b) by 82 days.

(21) Appl. No.: 15/150,215

(22) Filed: May 9, 2016

(65) Prior Publication Data

US 2016/0255585 A1  Sep. 1, 2016

Related U.S. Application Data

(63) Continuation of application No. 14/142,880, filed on Dec. 29, 2013, now Pat. No. 9,369,958.

(60) Provisional application No. 61/770,200, filed on Feb. 27, 2013.

(51) Int. Cl.
*H04W 52/02* (2009.01)
*H04W 36/32* (2009.01)
*H04W 8/26* (2009.01)
*H04W 36/16* (2009.01)

(52) U.S. Cl.
CPC ......... *H04W 52/0219* (2013.01); *H04W 8/26* (2013.01); *H04W 36/16* (2013.01); *H04W 36/32* (2013.01); *Y02D 30/70* (2020.08)

(58) Field of Classification Search
CPC ... H04W 52/0219; H04W 8/26; H04W 36/16; H04W 36/32; Y02B 60/50
See application file for complete search history.

(56) References Cited

U.S. PATENT DOCUMENTS

| 5,508,706 A | 4/1996 | Tsou et al. |
| 6,141,565 A | 10/2000 | Feuerstein et al. |
| 9,369,958 B2 | 6/2016 | Pasquereau et al. |
| 2004/0174258 A1 | 9/2004 | Edelstein et al. |
| 2005/0233700 A1 | 10/2005 | Pecen et al. |

(Continued)

OTHER PUBLICATIONS

3GPP, 3rd Generation Partnership Project; Technical Specification Group Radio Access Network; Evolved Universal Terrestrial Radio Access (E-UTRA); Mobility enhancements in heterogeneous networks (Release 11), 53 pages, 3GPP TR 36.839 V11.1.0 (Dec. 2012), 2012, 3GPP Organizational Partners.

(Continued)

*Primary Examiner* — German Viana Di Prisco
(74) *Attorney, Agent, or Firm* — Amin, Turocy & Watson, LLP

(57) ABSTRACT

One example of a method of managing battery usage by a wireless mobile communication device includes reading a start time, an end time, and other information, for each of a number of extents, and identifying one or more handovers, using the start time, end time, and other information, wherein the one or more handovers are handover activity. Next, the handover activity is compared to an allowable threshold, and a determination made as to when the number of idle mode handovers exceeds the allowable threshold. Finally, battery usage by the wireless mobile communication device is reduced by taking action to reduce the number of idle mode handovers that occur.

20 Claims, 6 Drawing Sheets

Exemplary Listing of Extents On A Device

| Start Time | End Time | duration(ms) | State | cgi |
|---|---|---|---|---|
| 142845306 | 142852651 | 7345 | Searching | |
| 142852651 | 142854608 | 1957 | 3G | 310-260-08198-10121 |
| 142854608 | 142861236 | 6628 | NA | |
| 142861236 | 142884512 | 23276 | 3G | 310-260-08198-10123 |
| 142884512 | 142893041 | 8529 | NA | |
| 142893041 | 142932152 | 39111 | 3G | 310-260-08198-10123 |
| 142932152 | 142936838 | 4686 | NA | |
| 142936838 | 142953296 | 16458 | 3G | 310-260-08198-10123 |
| 143188496 | 143193790 | 5294 | NA | |
| 143560920 | 143742551 | 181631 | No Service | |

(56) References Cited

U.S. PATENT DOCUMENTS

| | | | |
|---|---|---|---|
| 2006/0245530 A1* | 11/2006 | Pradhan | H04W 48/16 375/364 |
| 2006/0258386 A1* | 11/2006 | Jeong | H04W 36/24 455/525 |
| 2007/0165583 A1 | 7/2007 | Pecen | |
| 2008/0242298 A1* | 10/2008 | Nylander | H04W 16/32 455/435.2 |
| 2010/0029274 A1* | 2/2010 | Deshpande | H04W 48/16 455/435.3 |
| 2010/0113019 A1* | 5/2010 | Jeong | H04W 36/0005 455/435.2 |
| 2010/0317349 A1* | 12/2010 | Serravalle | H04W 24/10 455/440 |
| 2011/0026486 A1* | 2/2011 | Hapsari | H04W 8/20 370/331 |
| 2011/0143699 A1* | 6/2011 | Noh | H04W 52/0261 455/127.1 |
| 2011/0201279 A1* | 8/2011 | Suzuki | H04W 24/10 455/67.11 |
| 2012/0071167 A1* | 3/2012 | Bhandari | H04W 48/20 455/443 |
| 2013/0225171 A1* | 8/2013 | Singh | H04W 36/16 455/436 |
| 2014/0349656 A1* | 11/2014 | Sfar | H04W 36/36 455/437 |
| 2014/0357273 A1* | 12/2014 | Teng | H04W 36/32 455/436 |
| 2015/0358868 A1* | 12/2015 | Wegmann | H04W 36/0083 455/436 |

OTHER PUBLICATIONS

Office Action of U.S. Appl. No. 14/142,880, dated Jun. 17, 2015, filed Dec. 29, 2013.
Notice of Allowance of U.S. Appl. No. 14/142,880, dated Jan. 27, 2016, filed Dec. 29, 2013.
U.S. Appl. No. 61/770,200, filed Feb. 27, 2013, Pasquereau, et al.
U.S. Appl. No. 14/142,880, filed Dec. 29, 2013, Pasquereau, et al.
U.S. Appl. No. 14/142,880, May 13, 2016, Notice of Allowance.

* cited by examiner

Exemplary Listing of Extents On A Device

```
||Start Time||End Time||duration(ms)||State ||    cgi         ||
|142845306   |142852651|        7345|Searching| |
|142852651   |142854608|        1957|3G|310-260-08198-10121|
|142854608   |142861236|        6628|NA|                    |
|142861236   |142884512|       23276|3G|310-260-08198-10123|
|142884512   |142893041|        8529|NA|                    |
|142893041   |142932152|       39111|3G|310-260-08198-10123|
|142932152   |142936838|        4686|NA|                    |
|142936838   |142953296|       16458|3G|310-260-08198-10123|
|143188496   |143193790|        5294|NA|                    |
|143560920   |143742551|      181631|No Service| |
```

FIG. 2

WIRELESS DEVICE BATTERY OPTIMIZATION BY SUPPRESSING OSCILLATION IN CELL SCOPE DURING IDLE MODE

CROSS-REFERENCE TO RELATED APPLICATIONS

This application is a continuation of, and hereby claims priority to, U.S. patent application Ser. No. 14/142,880, issued as U.S. Pat. No. 9,369,958, entitled WIRELESS DEVICE BATTERY OPTIMIZATION BY SUPPRESSING OSCILLATION IN CELL SCOPE DURING IDLE MODE, filed Dec. 29, 2013, which in turn claims priority to U.S. Provisional Application Ser. No. 61/770,200, entitled DETECTION OF IDLE MODE MULTIPLE RE-SELECTIONS (PING/PONG) USING DATA COLLECTION AGENT ON WIRELESS DEVICE, filed Feb. 27, 2013. All of the aforementioned applications are incorporated herein in their respective entireties by this reference.

BACKGROUND

It is known that Cell Global Identity (CGI) is a standard identifier for mobile phone cells, providing means to geographically locate connected mobile phones. If a cell phone is connected to a GSM network then the position of that particular cell phone can be determined using CGI of the cell which is covering that cell phone. The battery life of a cell phone is affected when the phone changes cells in idle mode because in-between cells, the phone enters 'Searching' mode. In other words, when a phone cannot determine its Cellular Global Identity, the phone interactively checks other frequencies so it uses more battery than if it simply monitors the broadcast channel of a cell.

In some embodiments, wireless device or user equipment can receive information from the network because the base station (the antenna) sends a broadcast signal that contains all the CGI information. On the other hand, the user equipment only receives and decodes the broadcast signal, it doesn't have to send any signal to the network. So the network only generally knows where the device is because the device only contacts the network when it changes from one Location Area (LA) to another. An LA covers a group of cells.

When someone calls the phone, the phone will receive a paging message (in a signal broadcast by the cell) and then the phone will contact with the cell to establish a connection.

When the network planning of a system is not sufficiently tuned (especially when handover zones between cells are incorrectly planned) or when IRAT cell resection parameters in idle mode are wrong, a phone in idle mode may oscillate from one cell to another or into and out of the same cell. This has an impact on battery life as the phone spends more time looking for available cells compared to when it stays on a given cell.

It is known that a phone in idle mode doesn't report to the network. Therefore, network operators cannot directly determine where customer phones may be experiencing multiple idle mode handover.

It is known that data collection agents automatically collect data on a wireless device and upload it when indiscernible to its user. A data collection profile defines data to be collected and a trigger. When the trigger is sensed, data is collected according to the data collection profile. The collected data can be uploaded immediately, or stored for some period of time before being transmitted to a collection system. Data may be collected for a brief time before, during and after sensing the trigger and may be uploaded to a system.

It is known that a common source of customer dissatisfaction and ensuing churn is attributed to "poor" battery life of the handsets.

Frequently the proposed solution is to offer to exchange phones for the customer but devices returned for diagnosis exhibit a high probability of "no fault found". The replacement devices often exhibit the same or other failures which lowers customer satisfaction with the product offering and as soon as practicable, the customer departs for another vendor. Thus the cost of acquiring new customers is burdened by the cost of replacing lost customers.

For the purpose of this application we define the term extent to have a meaning of a time period between a begin time and an end time. A phone may stay on a cell during an extent during which it is associated with a CGI. When the phone is not on a specific cell it may be in an extent whose state is "Searching" or "No Service". Other extents may be periods during which the CGI information cannot be decoded e.g. Not Available, or Not Accessible Thus it can be appreciated that what is needed is a way to detect a misconfiguration of a wireless network which leads to poor battery life because phone in idle mode are excessively switching from one cell to another. Changes to the network service or to the phone itself could accommodate or remediate the misconfiguration.

SUMMARY OF AN INVENTION

A method detects a configuration of a wireless network which wastes battery power in mobile devices within a location area of the network. A data collection agent installed in a wireless device records and reports idle-mode handovers.

An analytics circuit reads RF measurements and locations from these reports to suggest where handover zones may be optimized or IRAT cell resection parameters are defective. The analytic distinguishes between normal handover during transit across many cellular locations during a period of time and undesirable handover into one or among a few cells which cannot be observed by the network.

A mobile device may self-tune battery consumption by determining its individual location areas of high battery consumption; desensitizing itself to cell signal strength instability; and increasing its tenacity to most recently used cell. The analysis tool depends on two selectable thresholds.

BRIEF DESCRIPTION OF FIGURES

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 2 is Exemplary Listing of Extents On A Device reported by an agent;

DETAILED DISCLOSURE OF EMBODIMENTS

Figure 1:
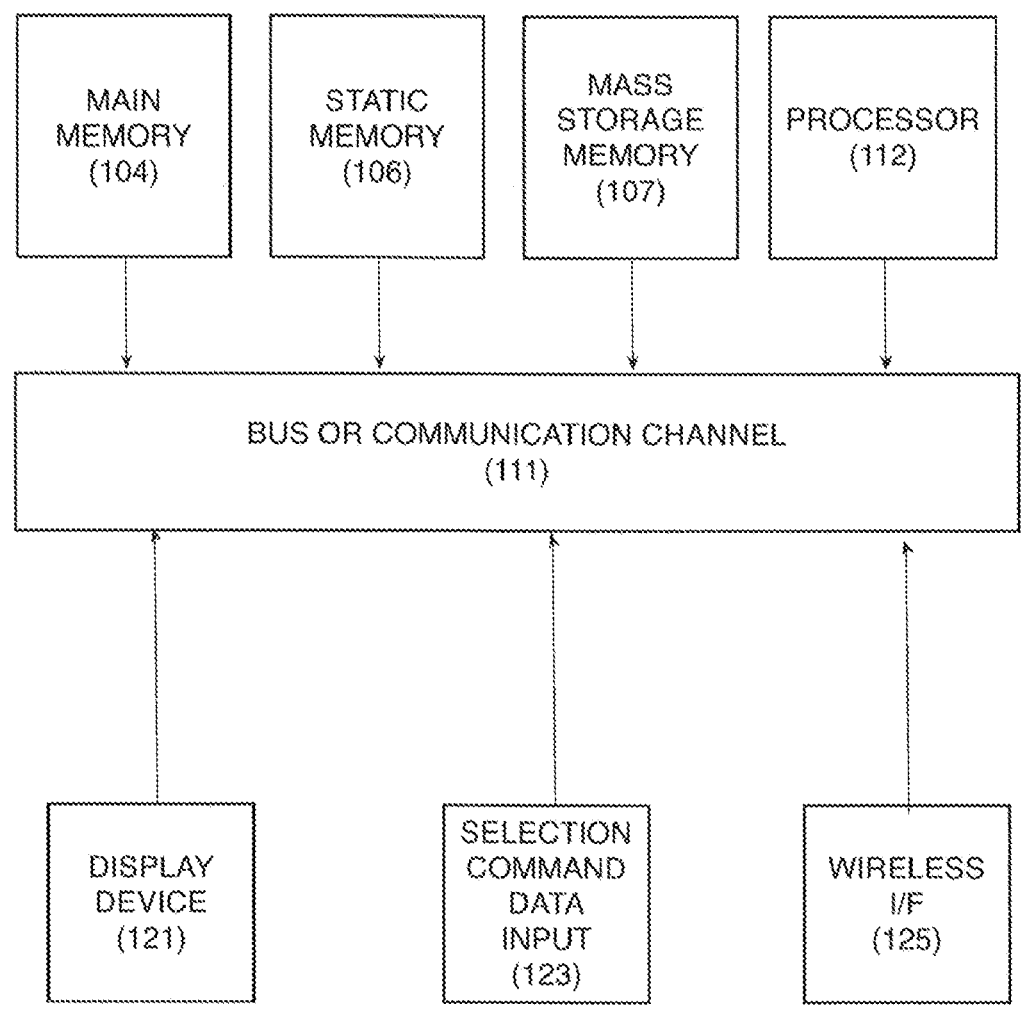
FIG. 1 is a block diagram of an exemplary computer system.

In an embodiment, this solution will detect multiple idle-mode handover and report them to the network operator (with RF measurements and location) so that the network operator can take action by changing network/antenna parameters to optimize handover areas so that battery-wasting multiple handovers no longer occur. Agents installed on wireless devices record status even when the devices are idle i.e. not connected to the network. The agent on the phone detects (among other things) idle mode handovers as well as their location and reports them, in an embodiment, to a server hosted platform where the mobile analytics detect the multiple handovers.

In an embodiment, the agent also collects where the multiple handover happen which is quite important as that way operator can also check that handovers happen where they are planned to happen. Using the agent, for every phone, it can be determined how long the phone stays on a specific cell (which has a given Radio Network Access), the cell being identified by the CGI (Cell Global ID) and how frequently the phone reconnects to the same CGI.

In an embodiment the phone is doing multiple handovers when: For Ne (default value 10) consecutive events, there are no more than Ndi (default 3) different CGI and at least Nde (default 4) detected CGI.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the descriptions, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer systems registers and memories into other data similarly represented as physical quantities within the computer system memories or registers or other such non-transitory information storage, communication circuits for transmitting or receiving, or display devices.

The present invention also relates to apparatus for performing the operations herein. This apparatus may be specifically constructed for the required purposes, or it may comprise application specific integrated circuits which are mask programmable or field programmable, or it may comprise a general purpose processor device selectively activated or reconfigured by a computer program comprising executable instructions and data stored in the computer. Such a computer program may be stored in a non-transitory computer readable storage medium, such as, but not limited to, any type of disk including floppy disks, optical disks, CD-ROMs, magnetic-optical disks, solid state disks, flash memory, read-only memories (ROMs), random access memories (RAMs), EPROMS, EEPROMS, magnetic or optical cards, or any type of non-transitory media suitable for storing electronic instructions, and each coupled to a computer system data channel or communication network.

The algorithms and displays presented herein are not inherently related to any particular computer, circuit, or other apparatus. Various configurable circuits and general purpose systems may be used with programs in accordance with the teachings herein, or it may prove convenient to construct more specialized apparatus to perform the required method steps in one or many processors. The required structure for a variety of these systems will be apparent from the description below. In addition, the present invention is not described with reference to any particular programming language or operating system environment. It will be appreciated that a variety of programming languages, operating systems, circuits, and virtual machines may be used to implement the teachings of the invention as described herein.

In the exemplary list of extents shown in FIG. 2 'multiple handover' are illustrated:

for 10 events there are 2 different GO (310-260-08198-10121 and 310-260-08198-10123), which is less than Ndi (3)

and 4 events (out of 10) have a CGI value, which is more or equal to Nde (4) and 4 events are recorded where the CGI information cannot be decoded.

It is important that the algorithm doesn't detect 'normal' multiple handover, for example when the phone is in a fast moving vehicle (or train).

In that case we would expect more than 3 different CGI as the UE moves from cell to cell. If the network is well planned, the phone should switch to a new cell (and not go back and forth between 2 or 3 cells).

Ideally, the events would record receiving CGI values without intervening N/A. N/A indicates "Not Available."

Figure 3:
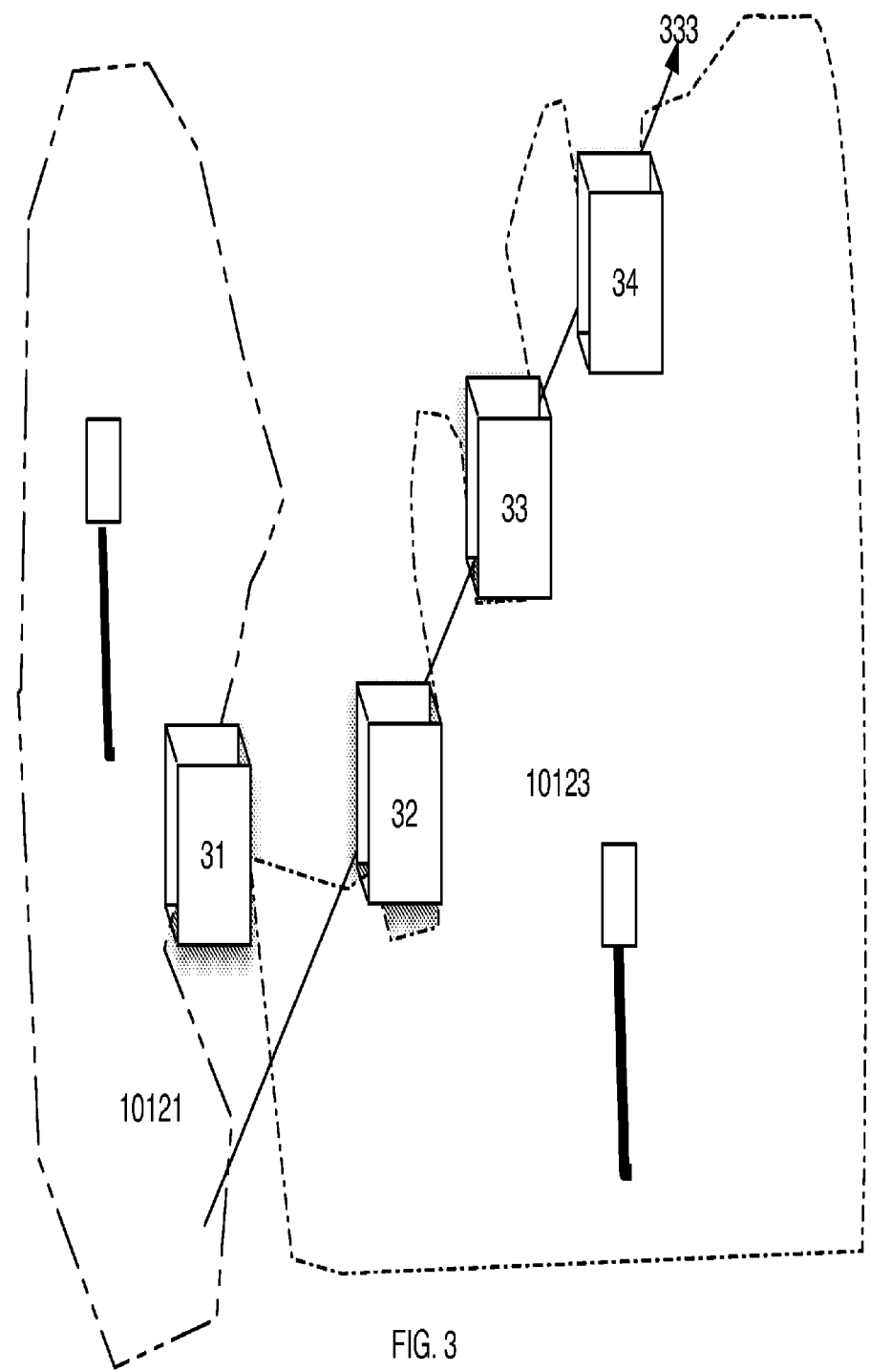
FIG. 3 illustrates a Location Area.

FIG. 3 illustrates a Location Area which has two cells 10121 10123 and several tall structures 31-34 which cast shadows in radio coverage patterns. A diagonal arrow follows the path a traveler with a cellular phone 333 takes from the lower left to the upper right during a period of time covered by several time extents. When the trip begins, the traveler is connected to the cell 10121 but then falls behind the shadow cast by structure 31. Next he is connected at the distant edge of cell 10123. This would so far be correct handovers. But some minor signal degradations from structures 32-34 cause repeated and unsuccessful searching or multiple idle-mode handovers which are costly in terms of battery consumption.

Figure 4:
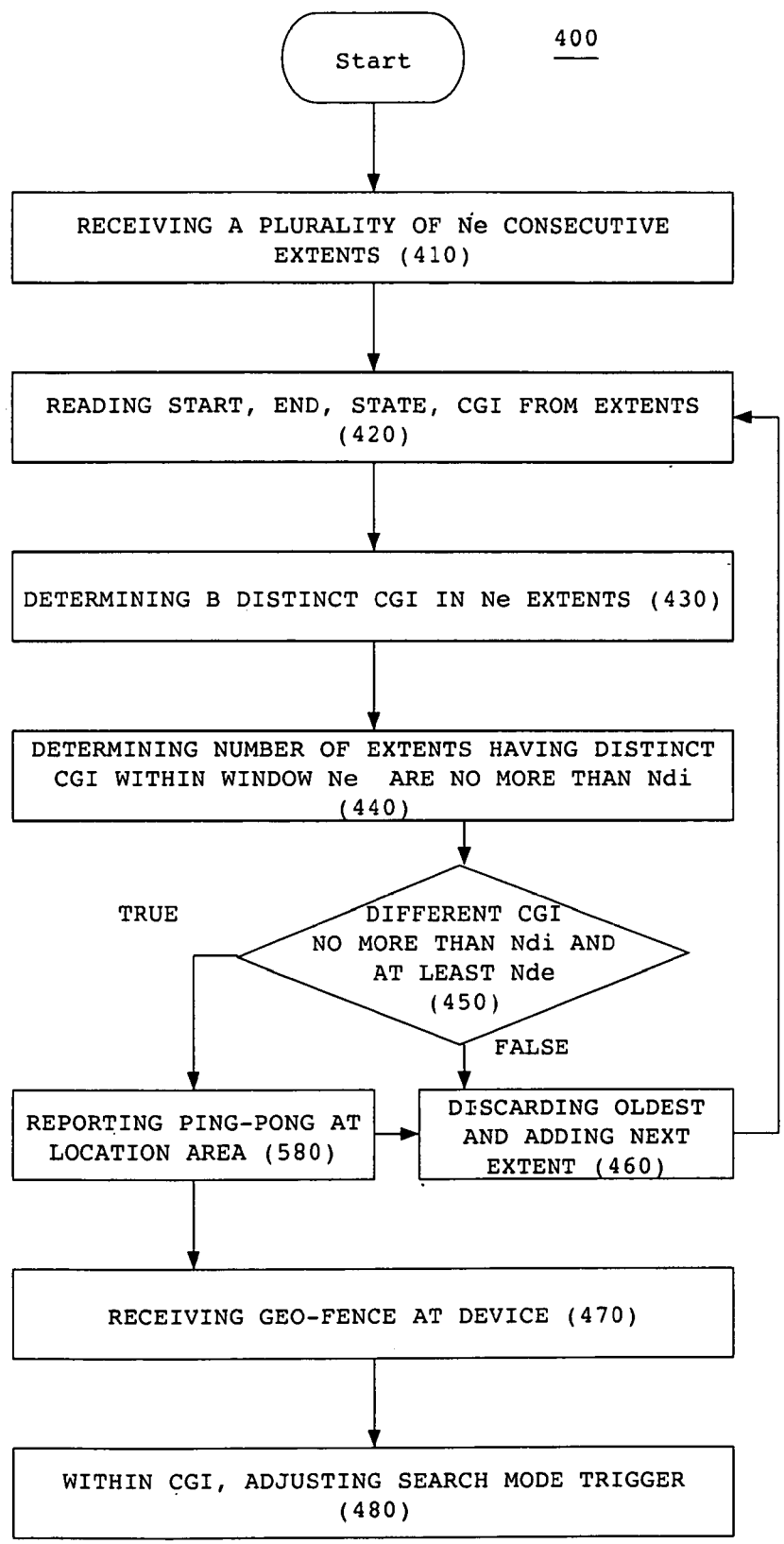
FIG. 4-5 are flowcharts of steps when executed by a processor in a method.

FIG. 4 is a flowchart for a method for determining and reporting a ping-pong characteristic at a Cellular Global Identity location 400 by receiving from an agent A controlling a mobile wireless device a plurality Ne of consecutive extents 410; reading start time, end time, state, and CGI from each of the extents 420; determining a number B of the distinct CGI values found in the plurality Ne of consecutive extents 430; for each distinct CGI value determining the number of extents within Ne extents which exceeds Ndi 440; determining when a plurality of consecutive extents contains not more than Ndi different CGI and at least Nde detected CGI 450; discarding an extent having a start time prior to the other extents and receiving an extent having a start time after the other extents in the plurality 460; at a mobile wireless device requesting a power geo-fence table; receiving a CGI and a desensitivity variable 470; and when located in said CGI cell, adjusting the time constant for entering a search mode after leaving said CGI cell 480.

Figure 5:
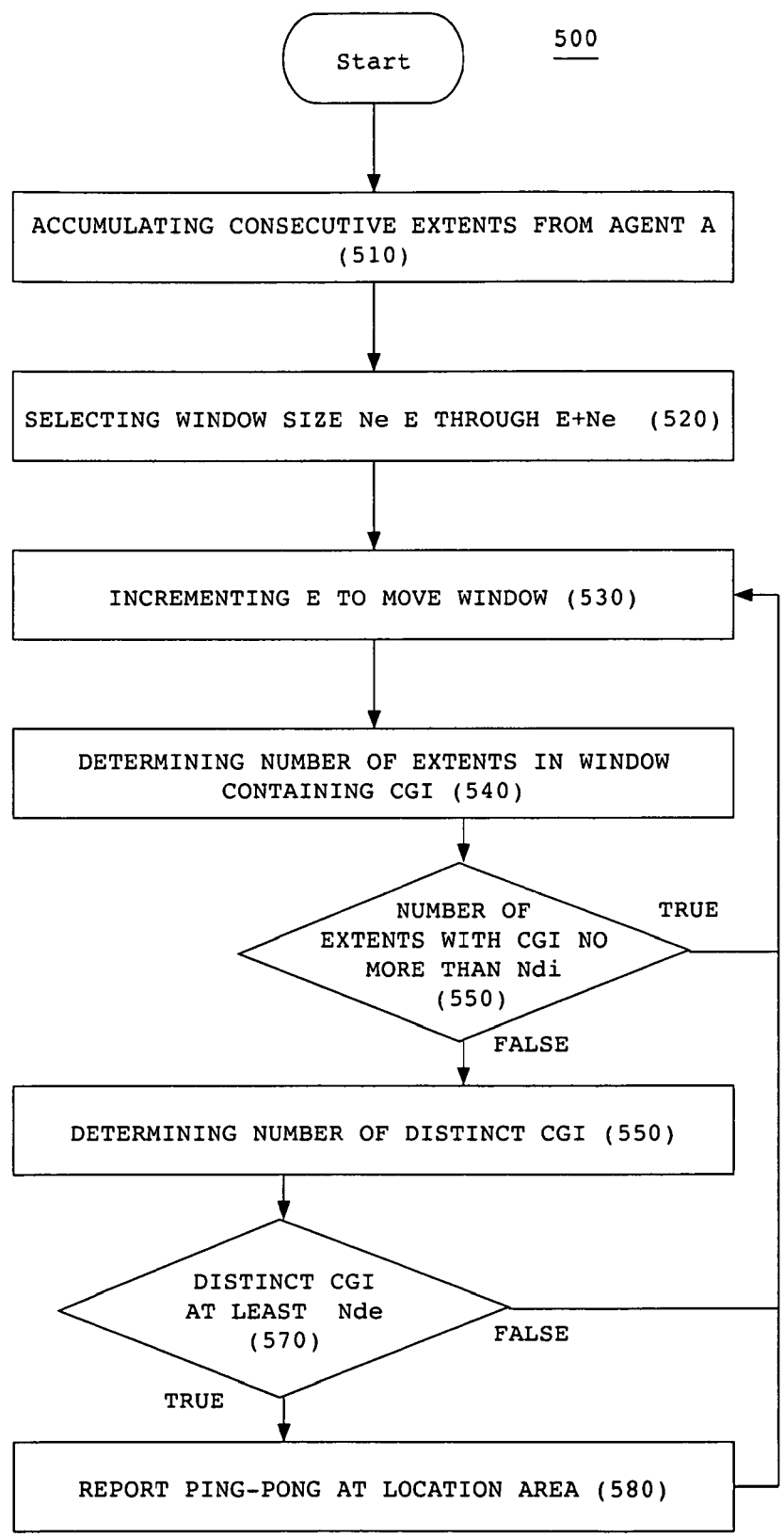

FIG. 5 is a flowchart of a method 500, at a server communicatively coupled to a wireless device, accumulating a series of consecutive extents reported by an agent A controlling said wireless device (E through E+Z) 510; selecting a window of size Ne beginning at extent E−1 for consecutive extents reported by an agent (extents E through E+Ne) 520; incrementing E to move the window across the history of consecutive extents reported by said agent 530; determining number of extents within window containing value CGI 540; when number of extents containing valid CGI less than Ndi, incrementing E 550; determining number of distinct CGI values within window 560; when number of distinct CGI values found within window exceeds Nde 570, incrementing E; and reporting Ping-Pong observation at location of the sequence of consecutive extents 580.

Figure 6:
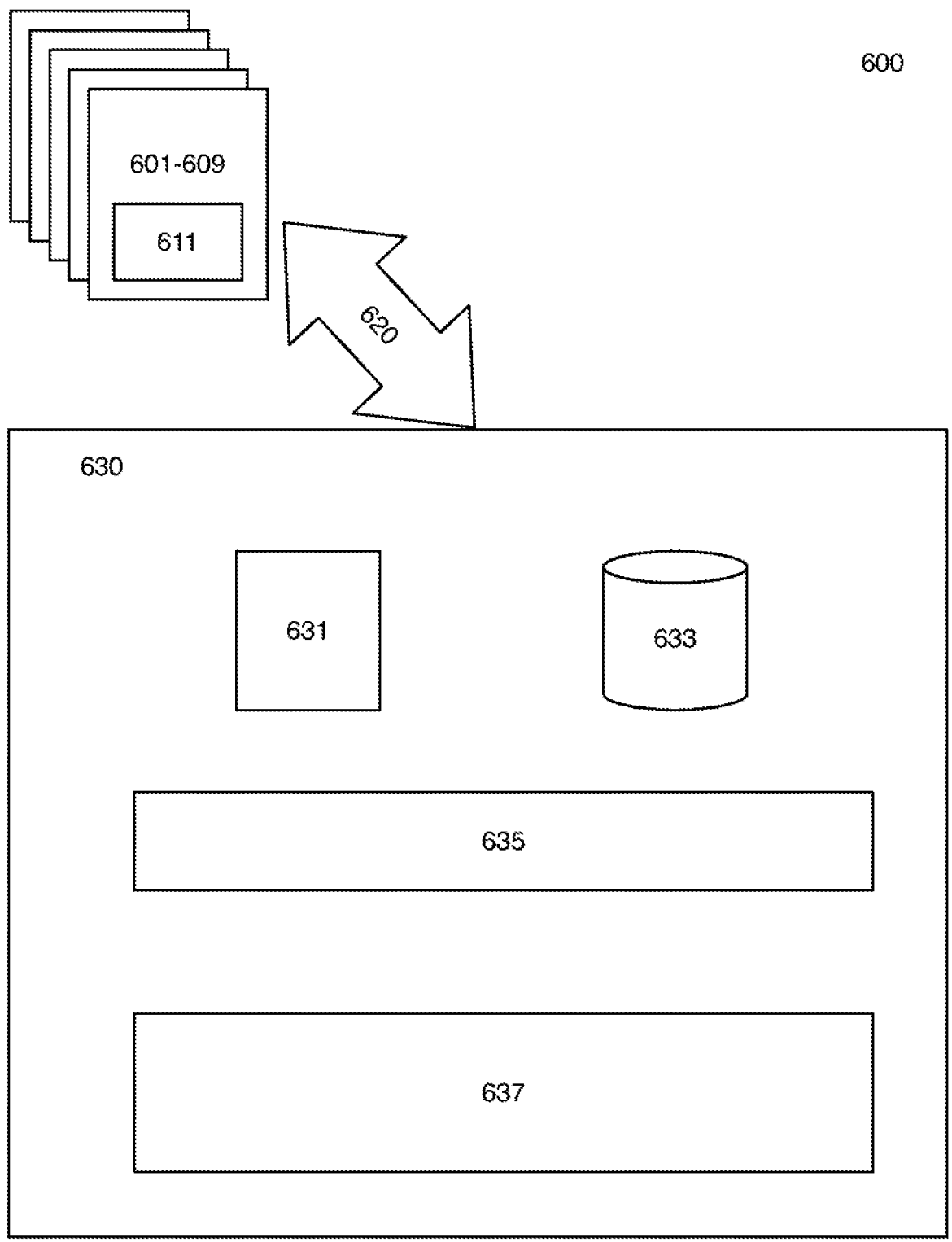
FIG. 6 is a block diagram of a system.

FIG. 6 is a block diagram of a system 600 system including a plurality of mobile wireless devices 601-609 coupled to a cellular network 620; each of the plurality of mobile wireless devices having a data collection agent 611; a server 630 coupled to the cellular network having a processor 631 and non-transitory storage 633; the server receiving from the data collection agents a plurality of extents which contain a start time, an end time, a state, and Cellular Global Identifier (CGI); a circuit 635 to accumulate a series of consecutive extents by an agent A controlling said wireless device; a circuit 637 to operate on extents within a window of size Ne beginning at extent E; to determine the number of distinct CGI values within a window; for each distinct CGI determining the number of extents within the window for each distinct CGI; to increment E to move the window across the series of consecutive extents; and to report observation of ping-pong characteristics at location CGI when the number of distinct CGI values within a window exceeds Nde.

One aspect of the subject matter is a system comprising: a plurality of mobile wireless devices coupled to a cellular network; each of the plurality of mobile wireless devices having a data collection agent; a server coupled to the cellular network having a processor and non-transitory storage; the server receiving from the data collection agents a plurality of extents which contain a start time, an end time, a state, and Cellular Global Identifier (CGI); a circuit to accumulate a series of consecutive extents by an agent A controlling said wireless device; a circuit to operate on extents within a window of size Ne beginning at extent E; to determine the number of distinct CGI values within a window; for each distinct CGI determining the number of extents within the window for each distinct CGI; to increment E to move the window across the series of consecutive extents; and to report observation of ping-pong characteristics at location CGI when the number of distinct CGI values within a window exceeds Nde.

Another aspect of the invention is a method at a server coupled to a plurality of mobile wireless devices through a cellular network comprising: determining and reporting a ping-pong characteristic at a Cellular Global Identity location by receiving from an agent A controlling a mobile wireless device a plurality Ne of consecutive extents; reading start time, end time, state, and CGI from each of the extents; determining a number B of the distinct CGI values found in the plurality Ne of consecutive extents; for each distinct CGI value determining the number of extents within Ne extents which exceeds Ndi.

In an embodiment the method also includes determining when a plurality of consecutive extents contains not more than Ndi different CGI and at least Nde detected CGI. In a an embodiment, the method also includes discarding an extent having a start time prior to the other extents and receiving an extent having a start time after the other extents in the plurality. In an embodiment, the method also includes, at a mobile wireless device, requesting a power geo-fence table; receiving a CGI and a desensitivity variable; when located in said CGI cell, adjusting the time constant for entering a search mode after leaving said CGI cell.

Another aspect of the invention is a method, at a server communicatively coupled to a wireless device, performing, by a processor, the steps: accumulating a series of consecutive extents reported by an agent A controlling said wireless device (E through E+Z); selecting a window of size Ne beginning at extent E−1 for consecutive extents reported by an agent (extents E through E+Ne); incrementing E to move the window across the history of consecutive extents reported by said agent; determining number of extents within window containing value CGI; when number of extents containing valid CGI less than Ndi, incrementing E; determining number of distinct CGI values within window; when number of distinct CGI values found within window exceeds Nde, incrementing E; and reporting Ping-Pong observation at location of the sequence of consecutive extents. In an embodiment, said agent could accumulate and determine the location of the sequence of consecutive events.

CONCLUSION

The present invention is easily distinguished from network based monitoring tools which cannot measure what is incident or internal to a mobile device. The present invention is easily distinguished from observations of normal multiple handover, for example when a phone is transported by fast moving vehicles such as planes, trains, and all-terrains. The present invention is easily distinguished from purely analytical methods which cannot repair or retune the operation of in individual mobile device.

Idle-mode multiple handovers, which negatively impact mobile phone user experience, were not easily reported before, so network operators could not cost-effectively detect and fix the issue. The battery life is affected when the phone changes cells in idle mode because in-between cells the phones goes in 'Searching' mode (the extents when the cgi is not known). The present invention allows a network operator to better understand the cause of low battery life for their mobile phone users and improve the performance of the network.

The present invention can be easily distinguished from conventional network monitoring methods because idle mode handover detection requires an agent to run on the device to collect the handover data in idle mode. Previously, only connected mode phenomena could be collected using network based measurements.

The techniques described herein can be implemented in digital electronic circuitry, or in computer hardware, firmware, software, or in combinations of them. The techniques can be implemented as a computer program product, i.e., a computer program tangibly embodied in an non-transitory medium, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

An Exemplary Computer System

FIG. 1 is a block diagram of an exemplary computer system that may be used to perform one or more of the functions described herein. Referring to FIG. 1, computer system 100 may comprise an exemplary client or server 100 computer system. Computer system 100 comprises a communication mechanism or bus 111 for communicating information, and a processor 112 coupled with bus 111 for processing information. Processor 112 includes a microprocessor, but is not limited to a microprocessor, such as for example, ARM™, Pentium™, etc.

System 100 further comprises a random access memory (RAM), or other dynamic storage device 104 (referred to as main memory) coupled to bus 111 for storing information and instructions to be executed by processor 112. Main memory 104 also may be used for storing temporary variables or other intermediate information during execution of instructions by processor 112.

Computer system 100 also comprises a read only memory (ROM) and/or other static storage device 106 coupled to bus 111 for storing static information and instructions for processor 112, and a non-transitory data storage device 107, such as a magnetic storage device or flash memory and its corresponding control circuits. Data storage device 107 is coupled to bus 111 for storing information and instructions.

Computer system 100 may further be coupled to a display device 121 such a flat panel display, coupled to bus 111 for displaying information to a computer user. Voice recognition, optical sensor, motion sensor, microphone, keyboard, touch screen input, and pointing devices 123 may be attached to bus 111 or a wireless interface 125 for communicating selections and command and data input to processor 112.

Note that any or all of the components of system 100 and associated hardware may be used in the present invention. However, it can be appreciated that other configurations of the computer system may include some or all of the devices in one apparatus, a network, or a distributed cloud of processors.

The embodiments described herein may include the use of a special purpose or general-purpose computer including various computer hardware or software modules, as discussed in greater detail below.

Embodiments within the scope of the present invention also include non-transitory, computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other non-transitory medium which can be used to store desired program code means in the form of computer-executable instructions or data structures and which can be accessed for execution by a general purpose or special purpose computer to perform a method as disclosed above.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

Those skilled in the art will appreciate that the invention may be practiced in network computing environments with many types of computing system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices or servers that are linked (either by hardwired links, wireless links, or by a combination of hardwired or wireless links) through a communications network. In a distributed computing environment, program modules may be located in both local and remote memory storage devices.

The present invention may also be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. A number of embodiments of the invention have been described. Nevertheless, it will be understood that various modifications may be made without departing from the spirit and scope of the invention. For example, other network topologies may be used. Accordingly, other embodiments are within the scope of the following claims.

We claim:

1. A wireless network operator entity configured to communicate with a plurality of wireless mobile communication devices, the wireless network operator entity comprising:
   a processor; and
   a non-transitory storage media including executable instructions which, when executed by or at a direction of the processor, cause the processor to perform operations comprising:
   receiving information from a wireless mobile communication device, wherein the information comprises a start time, an end time, and a Cell Global ID value, for each of a plurality of extents;
   analyzing the information to identify a number of idle mode handovers experienced by the wireless mobile communication device and to identify a respective location for each of the idle mode handovers, wherein a handover is identified as an idle mode handover by:
   determining, for a window that comprises a number of consecutive extents, a number of distinct Cell Global ID values within the window;
   identifying an idle mode handover as having occurred at a location of the consecutive extents when the number of distinct Cell Global ID values within the window is no more than a default number of distinct Cell Global ID values and a number of detected Cell Global ID values within the window is at least a default number of detected Cell Global ID values;
   determining when the number of the idle mode handovers exceeds an allowable threshold; and
   performing an action that is based on the number of the idle mode handovers experienced by the wireless mobile communication device, wherein the action, when taken, reduces battery usage by the wireless mobile communication device relative to what the battery usage was prior to the action being taken.

2. The wireless network operator entity of claim 1, wherein the wireless network operator entity cooperates with an agent of the wireless mobile communication device to determine one or more of how long the wireless mobile communication device stays on a specific cell, a cell being identified by a Cellular Global Identity, and a frequency with which the wireless mobile communication device reconnects to a same Cellular Global Identity.

3. The wireless network operator entity of claim 1, wherein analyzing the information further comprises distinguishing between an idle mode handover and a normal mode handover.

4. The wireless network operator entity of claim 1, wherein the information is received from a data collection agent of the wireless mobile communication device.

5. The wireless network operator entity of claim 1, wherein the action taken comprises changing a network parameter and/or an antenna parameter to optimize handover areas.

6. The wireless network operator entity of claim 1, wherein the operations further comprise reporting observation of a ping-pong characteristic at a location CGI when a number of distinct Cell Global ID values within the window exceeds the default number of detected Cell Global ID values.

7. The wireless network operator entity of claim 1, wherein the operations further comprise discarding an oldest extent and adding a next extent to the window when the number of distinct Cell Global ID values within the window is no more than a default number of distinct Cell Global ID values and a number of detected Cell Global ID values within the window is at least a default number of detected Cell Global ID values.

8. A non-transitory storage medium carrying instructions which are executable by one or more processors to perform operations comprising:
   receiving information from a wireless mobile communication device, wherein the information comprises a start time, an end time, and a Cell Global ID value, for each of a plurality of extents;
   analyzing the information to identify a number of idle mode handovers experienced by the wireless mobile communication device and to identify a respective location for each of the idle mode handovers, wherein a handover is identified as an idle mode handover by:
   determining, for a window that comprises a number of consecutive extents, a number of distinct Cell Global ID values within the window;
   identifying an idle mode handover as having occurred at a location of the consecutive extents when the number of distinct Cell Global ID values within the window is no more than a default number of distinct Cell Global ID values and a number of detected Cell Global ID values within the window is at least a default number of detected Cell Global ID values;
   determining when the number of the idle mode handovers exceeds an allowable threshold; and
   performing an action that is based on the number of the idle mode handovers experienced by the wireless mobile communication device, wherein the action, when taken, reduces battery usage by the wireless mobile communication device relative to what the battery usage was prior to the action being taken.

9. The non-transitory storage medium of claim 8, further comprising determining one or more of how long the wireless mobile communication device stays on a specific cell, a cell being identified by a Cellular Global Identity, and a frequency with which the wireless mobile communication device reconnects to a same Cellular Global Identity.

10. The non-transitory storage medium of claim 8, wherein analyzing the information further comprises distinguishing between an idle mode handover and a normal mode handover.

11. The non-transitory storage medium of claim 8, wherein the information is received from a data collection agent of the wireless mobile communication device.

12. The non-transitory storage medium of claim 8, wherein the action taken comprises changing a network parameter and/or an antenna parameter to optimize handover areas.

13. The non-transitory storage medium of claim 8, wherein the operations further comprise reporting observation of a ping-pong characteristic at a location CGI when a number of distinct Cell Global ID values within the window exceeds the default number of detected Cell Global ID values.

14. The non-transitory storage medium of claim 8, wherein the operations further comprise discarding an oldest extent and adding a next extent to the window when the number of distinct Cell Global ID values within the window is no more than a default number of distinct Cell Global ID values and a number of detected Cell Global ID values within the window is at least a default number of detected Cell Global ID values.

15. A method, comprising:
receiving information from a wireless mobile communication device, wherein the information comprises a start time, an end time, and a Cell Global ID value, for each of a plurality of extents;
analyzing the information to identify a number of idle mode handovers experienced by the wireless mobile communication device and to identify a respective location for each of the idle mode handovers, wherein a handover is identified as an idle mode handover by:
determining, for a window that comprises a number of consecutive extents, a number of distinct Cell Global ID values within the window;
identifying an idle mode handover as having occurred at a location of the consecutive extents when the number of distinct Cell Global ID values within the window is no more than a default number of distinct Cell Global ID values and a number of detected Cell Global ID values within the window is at least a default number of detected Cell Global ID values;
determining when the number of the idle mode handovers exceeds an allowable threshold; and
performing an action that is based on the number of the idle mode handovers experienced by the wireless mobile communication device, wherein the action, when taken, reduces battery usage by the wireless mobile communication device relative to what the battery usage was prior to the action being taken.

16. The method of claim 15, further comprising determining one or more of how long the wireless mobile communication device stays on a specific cell, a cell being identified by a Cellular Global Identity, and a frequency with which the wireless mobile communication device reconnects to a same Cellular Global Identity.

17. The method of claim 15, wherein analyzing the information further comprises distinguishing between an idle mode handover and a normal mode handover.

18. The method of claim 15, wherein the action taken comprises changing a network parameter and/or an antenna parameter to optimize handover areas.

19. The method of claim 15, further comprising reporting observation of a ping-pong characteristic at a location CGI when a number of distinct Cell Global ID values within the window exceeds the default number of detected Cell Global ID values.

20. The method of claim 15, further comprising discarding an oldest extent and adding a next extent to the window when the number of distinct Cell Global ID values within the window is no more than a default number of distinct Cell Global ID values and a number of detected Cell Global ID values within the window is at least a default number of detected Cell Global ID values.

* * * * *